US009557826B2

(12) United States Patent
Case et al.

(10) Patent No.: US 9,557,826 B2
(45) Date of Patent: Jan. 31, 2017

(54) APPARATUS, SYSTEM AND METHOD FOR FLEXIBLE TACTILE COMPUTER INPUT

(71) Applicant: LENOVO (Singapore) PTE, LTD., New Tech Park (SG)

(72) Inventors: Michaela Rose Case, Raleigh, NC (US); Xin Feng, Arcadia, CA (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 222 days.

(21) Appl. No.: 13/705,898

(22) Filed: Dec. 5, 2012

(65) Prior Publication Data

US 2014/0152542 A1    Jun. 5, 2014

(51) Int. Cl.
*G06F 3/03* (2006.01)
*G06F 3/033* (2013.01)

(52) U.S. Cl.
CPC .................. *G06F 3/03* (2013.01); *G06F 3/033* (2013.01); *G06F 2203/0333* (2013.01)

(58) Field of Classification Search
None
See application file for complete search history.

(56) References Cited

U.S. PATENT DOCUMENTS

| | | | | |
|---|---|---|---|---|
| 6,903,871 | B2 * | 6/2005 | Page | 359/443 |
| RE40,324 | E * | 5/2008 | Crawford | 345/157 |
| 8,064,684 | B2 * | 11/2011 | Ratti et al. | 382/154 |
| 2002/0130877 | A1 * | 9/2002 | Perry et al. | 345/581 |
| 2003/0004657 | A1 * | 1/2003 | Allen et al. | 702/45 |
| 2012/0293411 | A1 * | 11/2012 | Leithinger et al. | 345/158 |

* cited by examiner

*Primary Examiner* — David D Davis
(74) *Attorney, Agent, or Firm* — Kunzler Law Group

(57) ABSTRACT

An apparatus, system, and method are disclosed for flexible tactile computer input. A surface module may define a pressure-sensitive surface, any physical surface, or a virtual surface of a flexible input device, the surface having a default shape, reshaping the surface in response to physical proximity to one or more external objects, including one or more bodily appendages of a user, and restoring the default shape when the surface is not in physical proximity to the objects. A sensing module may sense manipulation of the flexible input device by the bodily appendages in proximity to the surface. An analysis module may interpret the manipulation of the flexible input device as input to a computer.

22 Claims, 7 Drawing Sheets

APPARATUS, SYSTEM AND METHOD FOR FLEXIBLE TACTILE COMPUTER INPUT

BACKGROUND

Field

The subject matter disclosed herein relates to computer input from a user and more particularly relates to tactile computer input.

Description of the Related Art

Tactile input devices employ touch and other physical manipulation by a user to communicate with a computer or other intelligent electronic system. Examples of such devices include mice, television remotes, touchpads, keyboards, gaming controllers, and so forth. Great strides forward have been made in making computer interfaces more intuitive and usable through the proliferation of such devices.

Nevertheless, current tactile input devices tend to be rigid and only comfortable for a segment of users due to their various shapes, sizes, and contours. Buttons and other contact areas may also be non-optimally placed for any given user. These designated areas limit the type of input a user can provide.

For example, a device such as a computer mouse may have buttons, a thumbwheel, or other touch areas. In addition, the mouse must be used in a specific orientation. Specifically, the tracking laser or ball must always be on the bottom, and the user's hand must make contact with the buttons or designated areas. Computer mice are also only available in a discrete number of shapes and sizes to meet various user preferences. Other tactile input devices as mentioned above have similar limitations.

BRIEF SUMMARY

Based on the foregoing discussion, the inventors have recognized that a long-felt unmet need exists for an apparatus, system, and method for flexible tactile computer input. Beneficially, such an apparatus, system, and method would be adaptable to a given user's physical characteristics and usage preferences.

Embodiments have been developed in response to the present state of the art, and in particular, in response to the problems and needs in the art hitherto proven intractable under currently available tactile computer input devices. Accordingly, the embodiments have been developed to provide a method, apparatus, and system for tactile computer input that overcome many or all of the above-discussed shortcomings in the art.

The apparatus for flexible tactile computer input is provided with a plurality of modules configured to functionally execute the necessary steps. These modules in the described embodiments include a surface module that defines a surface of a flexible input device, the surface having a default shape, reshapes the surface in response to physical proximity to one or more external objects, the objects including one or more bodily appendages of a user, and restores the default shape when the surface is not in physical proximity to the one or more objects, a sensing module that senses manipulation of the flexible input device by the one or more bodily appendages in proximity to the surface, and an analysis module that interprets the manipulation of the flexible input device as input to a computer.

In one embodiment, the flexible input device may be orientation-agnostic, meaning that it functions independently of its spatial orientation. In a further embodiment, the manipulation by the user may not be confined to any specific region of the surface. More specifically, the device may be button-less, allowing it to be used in an intuitive way without concern for "correct" contact with the device.

In an embodiment, direct proximity of the surface to one of the external objects dictates a type of the flexible input device. In a further embodiment, the external object may be flat, dictating the type of the flexible input device to be a mouse.

In another embodiment, the surface of the device may be pressure-sensitive. In a further embodiment, the flexible input device may incorporate an accelerometer.

A system is also presented for flexible tactile computer input. The system may be embodied by the computer, the flexible input device operatively coupled to the computer and the foregoing apparatus for flexible tactile computer input. In particular, the system, in one embodiment, may include an auxiliary sensor, apart from the flexible input device, the auxiliary sensor being employed by the sensing module. In a further embodiment, the auxiliary sensor may be at least in part electromagnetic.

In one or more embodiments, the flexible input device may behave at least in part as a mouse, a trackball, a thumbwheel, a touchpad, a touchscreen, a joystick, a remote, a game controller, a wand, a pedal, and so forth. In its physical construction, the flexible input device may include stretchable fabric, silicon electronic skin, rubber, low-resilience polyurethane foam, or the like.

In another embodiment, the system may be physically integrated with the flexible input device in a single compact form factor. Examples may include a personal data assistant ("PDA"), smart mobile phone, or the like. The device may therefore also include audio and visual input and output capability. It may also provide tactile output such as force feedback.

A method is also presented for flexible tactile computer input. The method in the disclosed embodiments substantially includes the steps necessary to carry out the functions presented above with respect to the operation of the described apparatus and system. In one embodiment, the method may include defining a surface of a flexible input device, the surface having a default shape, reshaping the surface in response to physical proximity to one or more external objects, the objects comprising one or more bodily appendages of a user, sensing manipulation of the flexible input device by the one or more bodily appendages in proximity to the surface, interpreting the manipulation of the flexible input device as input to a computer, and restoring the default shape when the surface is not in physical proximity to the one or more objects. Manipulations may include pressure, a touch gesture, two-dimensional displacement, three-dimensional motion, pointing, and so forth.

In an embodiment, sensing may be performed at a distance, away from the flexible input device. In a further embodiment, the flexible input device may be virtual, and its surface may be defined at least in part by the relative position of the external objects.

In one embodiment, a type of the flexible input device may be explicitly selected by the user. In a further embodiment, interpretation of the manipulation may be explicitly defined by the user.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
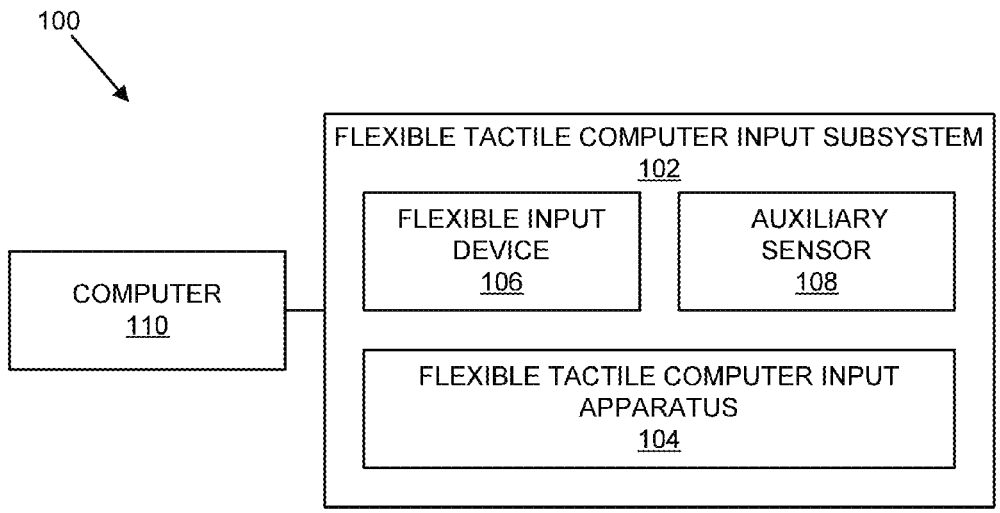
FIG. 1 is a schematic block diagram illustrating a system of a present embodiment.

As will be appreciated by one skilled in the art, aspects of the embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, RF, etc., or any suitable combination of the foregoing.

Computer readable program code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Embodiments disclosed herein allow for a wider range of input options for users, such as by utilizing pressure sensors to detect how the device is being used. Those devices that include flexible surfaces may not utilize the surfaces as part of the input and continue to require users to use them in a particular orientation. A flexible pressure sensor may allow users to adjust the shape of the input device to be more comfortable. For wireless devices, the orientation of the device is becoming less important for the information transfer, but continues to remain important for appropriate physical contact. Utilizing pressure sensor information may make the input device agnostic of orientation and method of use so that a wider range of approaches may be utilized.

FIG. 1 is a schematic block diagram illustrating a system 100 of a present embodiment, comprising a computer 110 and a flexible tactile computer input subsystem 102. The subsystem 102 further comprises a flexible tactile computer input apparatus 104, a flexible input device 106, and an auxiliary sensor 108. In an embodiment, the foregoing components of the subsystem 102 may be fully or partially implemented within a hardware platform and/or a software stack of the computer 110. In a further embodiment, the system 100 may be physically integrated with the flexible input device 106 in a single compact form factor, such as a personal digital assistant ("PDA"), smart mobile phone, and so forth.

The apparatus 104 may define a surface of the flexible input device 106, the surface having a default shape. The apparatus 104 may then reshape the surface in response to physical proximity to one or more external objects, sense manipulation of the flexible input device 106, interpret the manipulation as input to the computer 110, and finally restore the default shape when the external objects are withdrawn.

The flexible input device 106 may be made of a malleable material that possesses elastic deformation properties, and may employ pressure sensor technology (flexible, multipoint, etc.) or other sensor technology to allow for a wide variety of input methods. This combination would also eliminate the need for a specific physical orientation of the device 106. Sensor information may be used to determine if the device is set on a surface while in use, held in the hand, or other methods of using the input device 106. Based on this information, the input device 106 would behave in a different fashion.

In an embodiment, the malleable material may resume its original shape when left undisturbed. The malleable material may include a stretchable fabric such as Lycra®, silicon electronic skin such as that developed by John Rogers at the University of Illinois, rubber, low-resilience polyurethane foam, or the like. Materials may vary by restorative properties. Some materials may return to their original form faster than others. The material's original shape may vary as well. For example, an oval shape may be the default state of the device 106.

In one embodiment, the surface of the flexible input device 106 may be pressure-sensitive. The characteristics of the pressure sensors may vary by size, number, location, flexibility, and so forth. More specifically, the pressure-sensitive mechanism may be capacitive in nature. It may be deployed under the surface with flexible pressure sensors, such as those used in the Finger TPS™ system of Pressure Profile Systems, Inc. Alternatively, it may be integrated into the surface, such as with the artificial electronic skin. The characteristics of the flexible surface of the input device 106 may also vary by texture, flexibility, conductivity, and so forth. These variations may depend on the material of the input device 106, the method of determining orientation, and the type of pressure sensor.

In another embodiment, the sensing mechanism may not be implemented at or near the surface of the flexible input device 106, but may instead require an auxiliary sensor 108 to perform the sensing at a distance, away from the flexible input device 106. In a further embodiment, the auxiliary sensor 108 may be electromagnetic in nature.

Figure 2:
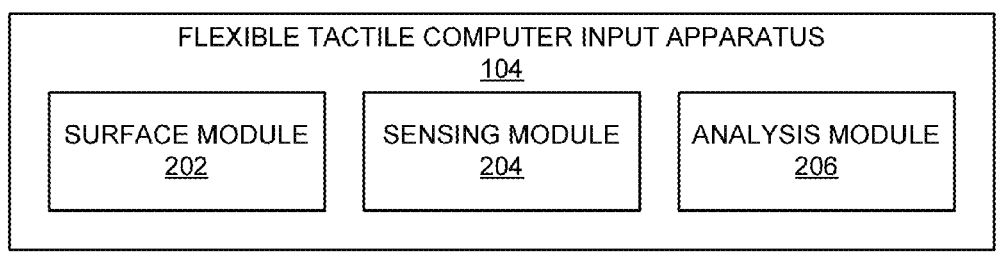
FIG. 2 is a schematic block diagram illustrating a flexible tactile computer input apparatus.

FIG. 2 is a schematic block diagram illustrating a flexible tactile computer input apparatus 104, comprising a surface module 202, a sensing module 204, and an analysis module 206. The surface module 202 may define the surface of the flexible input device 106, the surface having a default shape, reshape the surface in response to physical proximity to one or more external objects, the objects including one or more bodily appendages of a user, and restore the default shape of the surface when the surface is not in physical proximity to the one or more objects. The sensing module 204 may sense manipulation of the flexible input device 106 by the one or more bodily appendages in proximity to the surface. The analysis module 206 may then interpret the manipulation of the flexible input device 106 as input to the computer 110.

The surface module 202 may merely track the definition, modification, and restoration of the shape of the surface if the sensing mechanism is physically built into the flexible input device 106 as described above. Alternatively, the surface module 202 may utilize data obtained from the auxiliary sensor 108 in order to define, reshape, and restore a software model of the surface for use in conjunction with the sensing module 204 and the analysis module 206.

The sensing module 204 may sense manipulation of the flexible input device 106 from a change in pressure somewhere on its surface, as detected by the pressure-sensitive mechanisms described above. Alternatively, it may sense the manipulation of the flexible input device 106 by a deflection of the surface or by relative movement involving one or more of the objects in direct proximity to the surface, as detected by the auxiliary sensor 108.

The analysis module 206 may interpret the manipulation as input to the computer, whether the manipulation is detected directly by a pressure-sensitive mechanism or indirectly by the auxiliary sensor 108. The interpretation may be independent of where on the surface the manipulation is made, unlike an input device that has discrete buttons or other fixed regions for contact by the user. The interpretation may also be performed independent of the orientation of the flexible input device 106. If the orientation and/or motion of the flexible input device 106 were relevant to the interpretation of a given manipulation, detection may be provided by an internal accelerometer built into it for that purpose.

Figure 3:
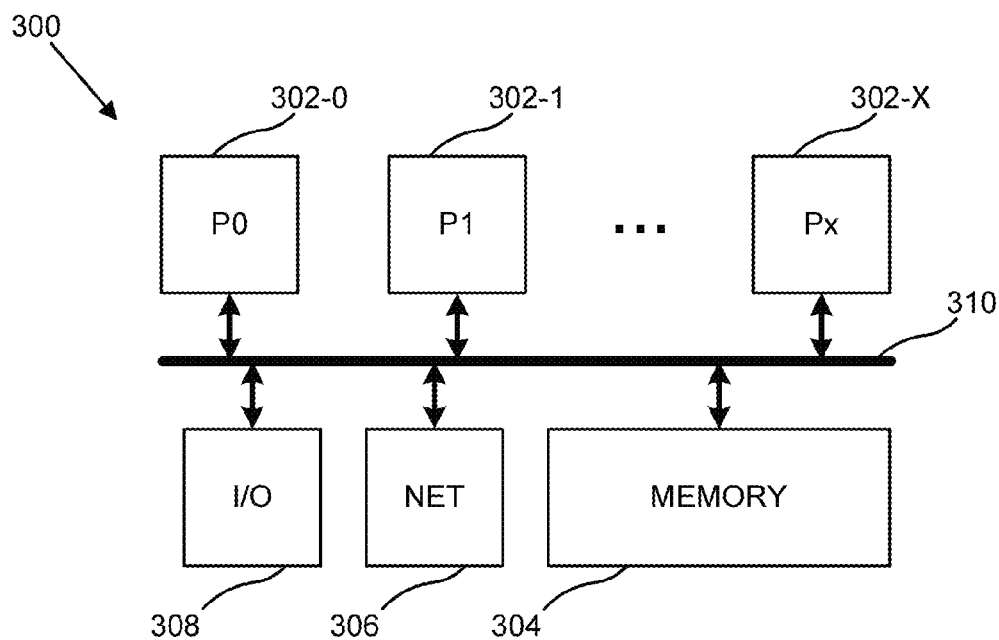
FIG. 3 is a schematic block diagram illustrating a possible computer hardware platform upon which the present embodiments may be at least in part deployed.

FIG. 3 illustrates a possible computer hardware platform 300 upon which present embodiments may be at least in part deployed. The hardware platform 300 may include processor(s) 302, memory 304, a network interface 306, and an I/O (Input/Output) device interface 308, connected through a bus 310.

The hardware platform 300 may be of any form factor or type, including an embedded system, a handheld, a mobile phone, a pad, a notebook, a personal computer, a minicomputer, a server, a mainframe, a supercomputer, and the like.

The processor(s) 302 may be present in any quantity, including a uniprocessor, and may have any instruction set architecture. In an embodiment, the processor(s) 302 may have one or more levels of dedicated or shared caches. Possible physical implementations may include multi-chip, single chip, multi-core, hyperthreaded processors, and the like.

The memory 304 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 306 may support any network protocol or architecture. It may support both wireless and hard-wired network connections. It may comprise Ethernet, Token Ring, System Network Architecture ("SNA"), and the like. In one embodiment, it may be integrated with the I/O device interface 308.

The I/O device interface 308 may be driven primarily by the processor(s) 302 or may incorporate an independent I/O processor subsystem. It may comprise Peripheral Component Interconnect ("PCI"), Small Computer System Interface ("SCSI"), Fiberchannel ("FC"), Enterprise System Connection ("ESCON"), ESCON over Fiberchannel ("FICON"), and the like. In an embodiment, it may include dedicated local I/O devices.

The bus 310 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 310 may comprise a high-speed internal network.

Figure 4:
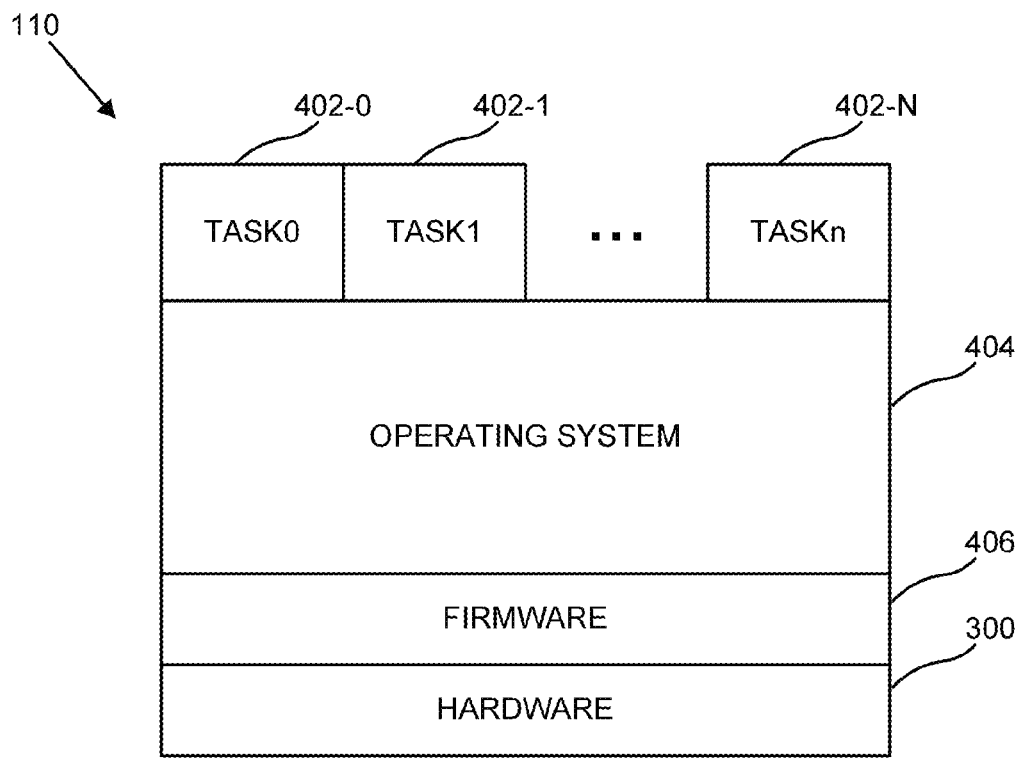
FIG. 4 is a schematic block diagram of a possible computer including a software stack in which present embodiments may at least in part reside.

FIG. 4 is a diagram of a possible computer 110 including a software stack in which the present embodiments may at least in part reside. The software stack may include task(s) 402, hosted on an operating system 404, enabled by firmware 406, running on a hardware platform 300 of which the configuration of FIG. 3 is representative.

The task(s) 402 may include both user- and system-level tasks. They may be interactive or batch. They may run in the foreground or background. User-level task(s) 402 may include applications, programs, jobs, middleware, and the like. System-level task(s) 402 may include services, drivers, daemons, utilities, and the like.

The operating system 404 may be of any type and version and in any state. Types may include Unix, Linux, Windows, Mac, MVS, VMS, and the like. Versions may include Windows XP, Windows Vista, and the like. States may include a degree of customization, a mode of operation, a system preparation for setup, and the like. The operating system 404 may be single-user or multi-user. It may be single-tasking or multi-tasking. In an embodiment, the operating system 404 may be real-time. In another embodiment, the operating system 404 may be embedded.

The firmware 406 may comprise microcode, which may reside in a microstore of the processor(s) 302. In an embodiment, the firmware 406 may comprise low-level software, which may reside in memory 304. In one embodiment, the firmware 406 may comprise a rudimentary operating system 404. In a further embodiment, the firmware 406 may support virtualization so as to permit the concurrent operation of multiple operating systems 404 on a hardware platform 300.

Figure 5:
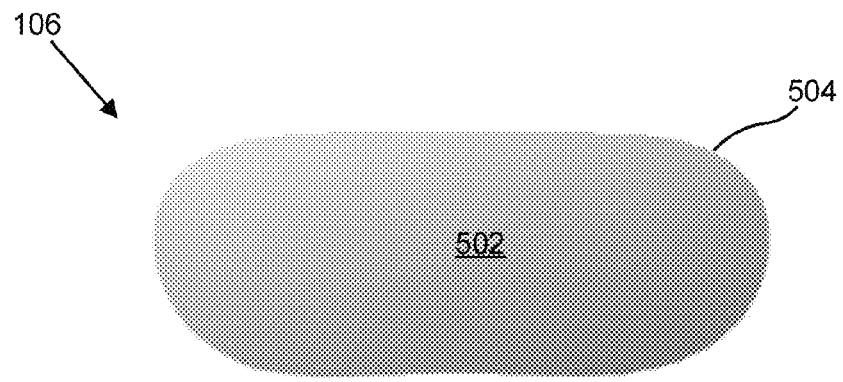
FIG. 5 is a perspective view of one embodiment of flexible input device with a pressure-sensitive surface; exhibiting a default shape of the device when no pressure is applied.

FIG. 5 is a perspective view of one embodiment of flexible input device 106 with a pressure-sensitive surface 502; exhibiting a default shape 504 of the device 106 when no pressure is applied. While at rest and not subject to handling by a user, the input device 106 and/or its surface 502 continue to maintain the default shape 504.

Figure 6:
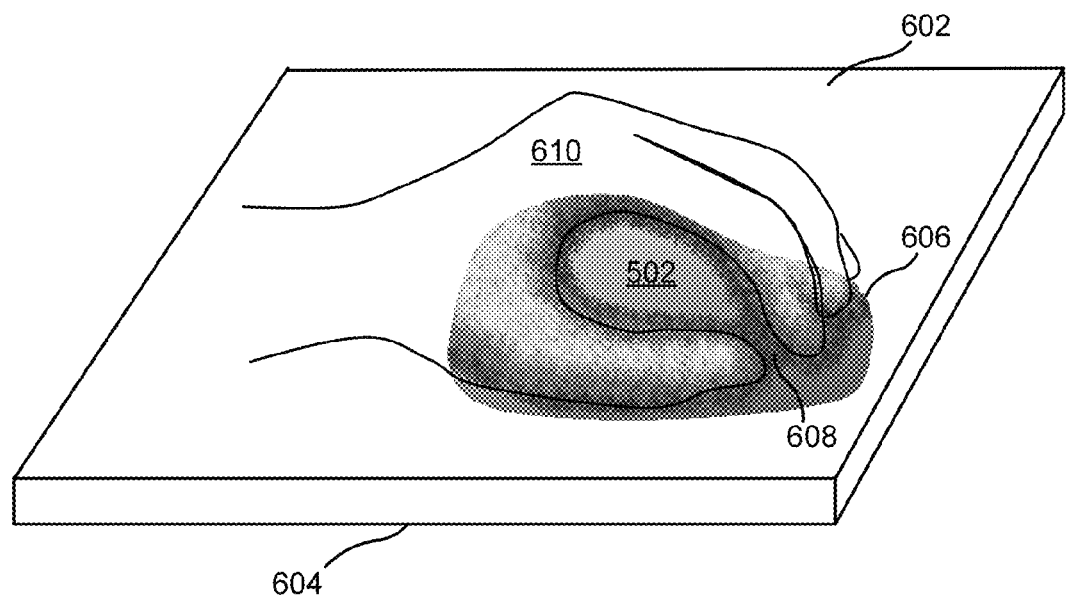
FIG. 6 is a perspective view of the flexible input device on a top flat surface of an object, assuming a modified shape in response to downward manual pressure from a hand of a user.

FIG. 6 is a perspective view of the flexible input device 106 on a top flat surface 602 of an object 604, assuming a modified shape 606 in response to downward manual pressure 608 from a hand 610 of a user. Its shape 606 deforms when pressure 608 is applied. Depending on the way pressure 608 is applied, the input device 106 can be used differently. The direct proximity of the surface 502 to one or more external objects 604 may dictate a type of the flexible input device.

For example, if the device 106 is placed on a desk, the pressure data from the flat surface 602 of the desk could cause the device 106 to prepare for input on the other side of its surface 502. If the user places their hand 610 on the device 106 while it is set on the flat surface 602, the combination of pressure information could make the device 106 behave like a computer mouse.

Figure 7:
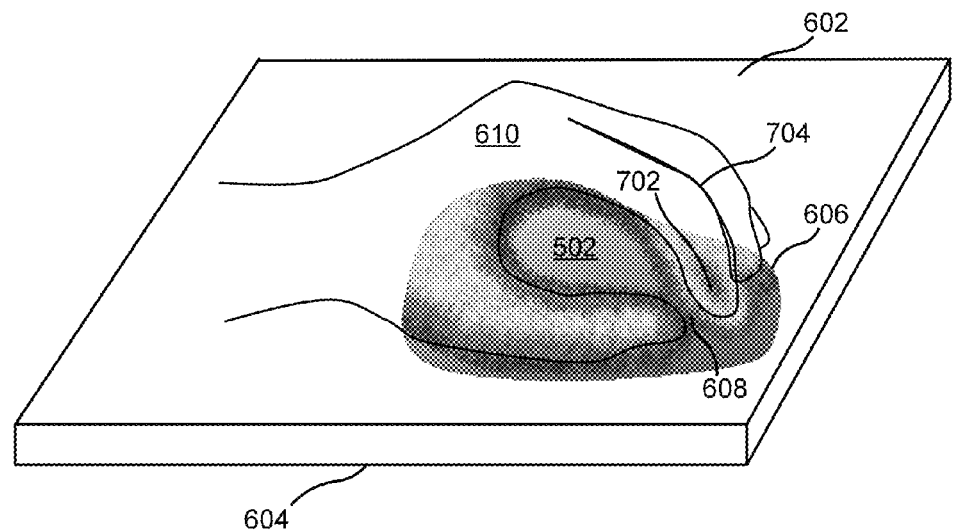
FIG. 7 is a perspective view of the flexible input device experiencing an increase in pressure from an index finger of the user.

FIG. 7 is a perspective view of the flexible input device 106 experiencing an increase in pressure 702 from an index finger 704 of the user. Changes in pressure 702 may registered as input. In this example it could be a click.

Figure 8:
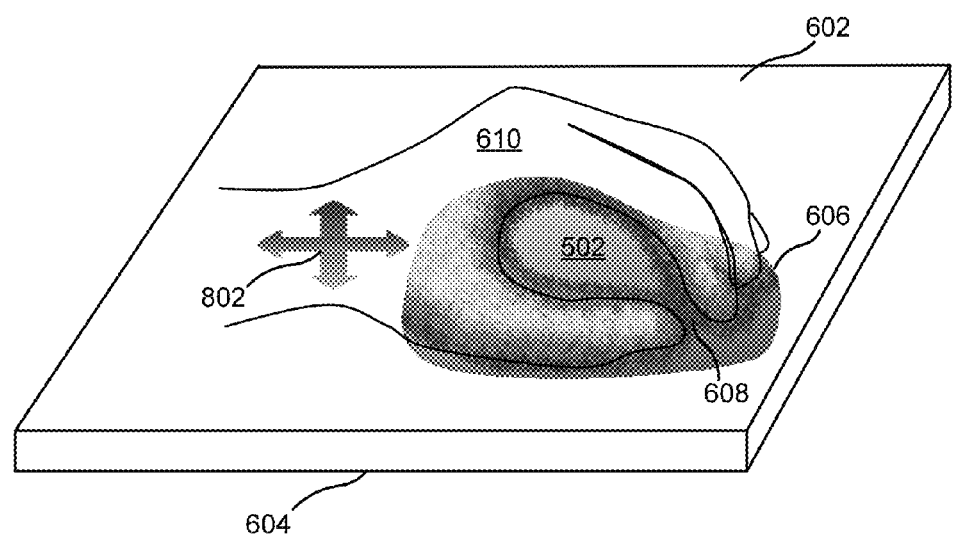
FIG. 8 is a perspective view of the flexible input device experiencing two-dimensional displacement across the flat surface.

FIG. 8 is a perspective view of the flexible input device 106 experiencing two-dimensional displacement 802 across the flat surface 602. The cursor movement may be controlled via the motion 802 of the device 106, in the same way as a regular mouse.

Figure 9:
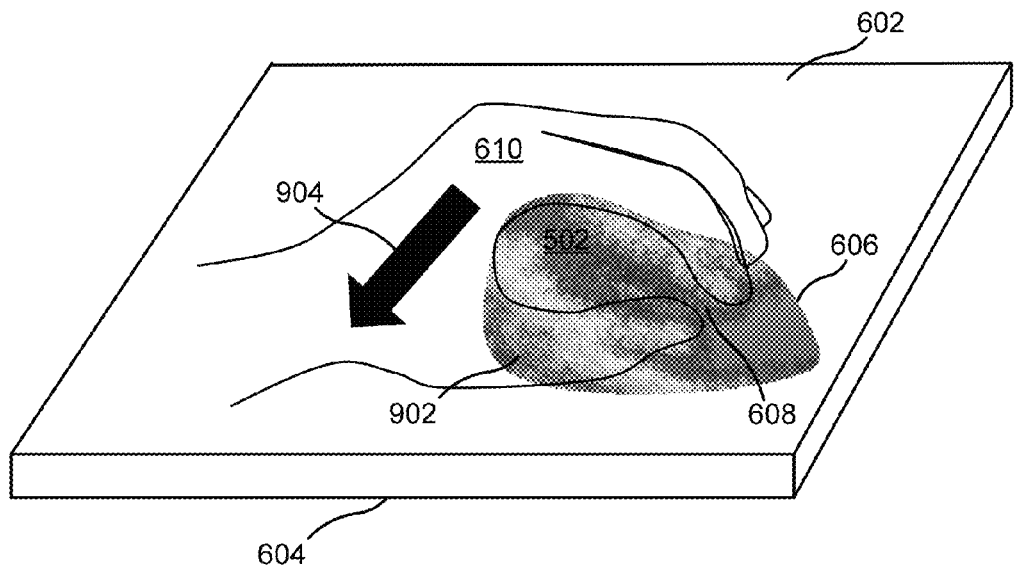
FIG. 9 is a perspective view of the flexible input device experiencing a shift in pressure in a lateral direction from the hand of the user.

FIG. 9 is a perspective view of the flexible input device 106 experiencing a shift in pressure 902 in a lateral direction 904 from the hand 610 of the user. In this manner the cursor may be controlled by tilting pressure 902 analogous to a joystick. The input device 106 would remain stationary and simply switch in the desired direction 904.

Figures 10, 11:
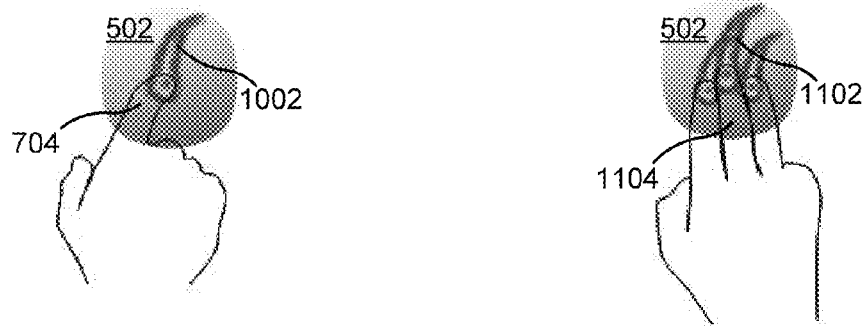
FIG. 10 is a perspective view of the flexible input device experiencing a gesture comprising a narrow stroke across its surface by the index finger of the user.
FIG. 11 is a perspective view of the flexible input device experiencing a gesture comprising a wide stroke across its surface by three middle fingers of the user.

FIG. 10 is a perspective view of the flexible input device 106 experiencing a gesture comprising a narrow stroke 1002 across its surface 502 by the index finger 704 of the user. FIG. 11 is a perspective view of the flexible input device experiencing a gesture comprising a wide stroke 1102 across its surface by three middle fingers 1104 of the user. Gestures such as these may be performed by utilizing different types of contact analogous to touchpads and touchscreens. In one or more embodiments, the flexible input device 106 may behave at least in part as a mouse, a trackball, a thumbwheel, a touchpad, a touchscreen, a joystick, a remote, a game controller, a wand, or a pedal.

Figure 12:
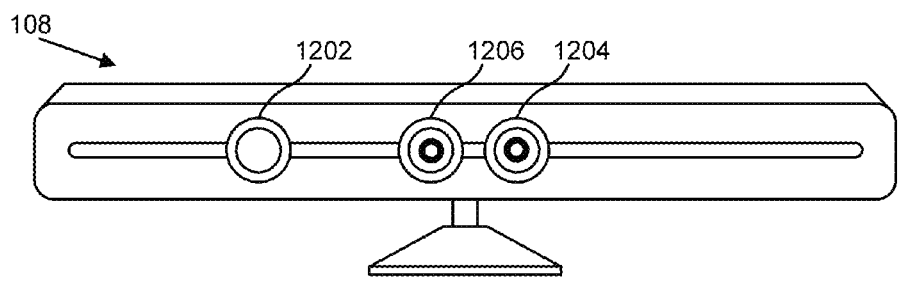
FIG. 12 is a perspective view of one embodiment of an auxiliary sensor.

FIG. 12 is a perspective view of one embodiment of an auxiliary sensor 108, a depth-sensing video camera. The camera 108 may comprise a color-coded infrared light source 1202, infrared image sensor 1204, and a visible light color image sensor 1206. The camera 108 acquires a depth image by directing a pattern of invisible infrared light from the source 1202 toward the flexible input device 106 and its surrounding environment. The infrared image sensor 1204 then reads the coded infrared light reflected back from the scene. After the light coding, the sensing module 204 uses a stereoscopic triangulation algorithm to process the data from the infrared sensor 1204 against the original infrared light pattern to create an accurate per-frame depth image, and superimposes it on the scene as captured in real time by the visible light sensor 1206.

Figure 13:
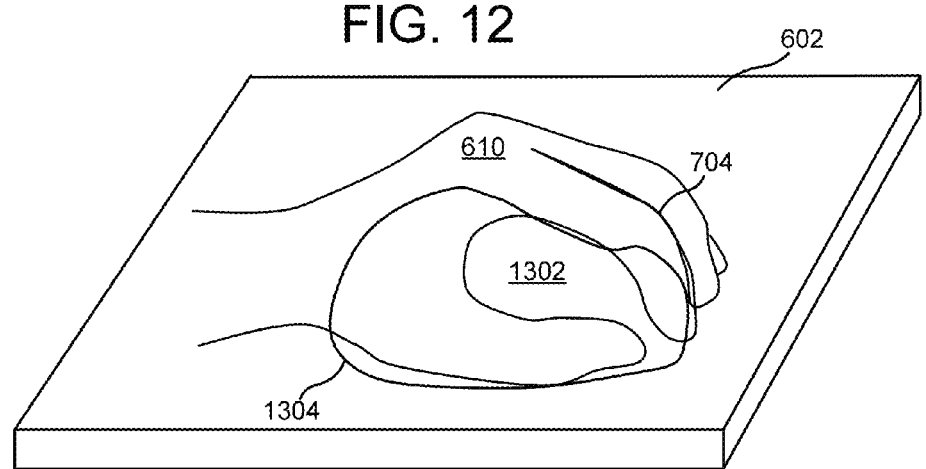
FIG. 13 is a perspective view of an embodiment of a flexible input device with a physical surface that is not pressure-sensitive.

FIG. 13 is a perspective view of an embodiment of a flexible input device 106 with a physical surface 1302 that is not pressure-sensitive. Rather than using pressure to detect user manipulations of the surface 1302, the auxiliary sensor 108 is able to optically detect changes in the physical shape 1304, including slight deflections in the physical surface 1302, and/or to detect movements of the hand 610. Thus the device 106 may not incorporate any electronics at all, but may be any malleable object chosen by the user, such as a foam ball, squeeze toy, or the like.

In another embodiment, the device 106 may be rigid rather than malleable, such as a toy gun or any other convenient object, and the auxiliary sensor 108 may detect manipulations of the device 106 from movements and deformations of the hand 610 of the user. For example, if the toy gun lacks a trigger, the mere act of squeezing the index finger 704 of the user could be interpreted as firing the gun. Similarly, any other control areas or buttons that are physically lacking from the device 106 may be defined, subject only to the imagination of the user. The physical shape 1304 of the surface 1302 effectively becomes just a prop to aid the user's imagination.

Figure 14:
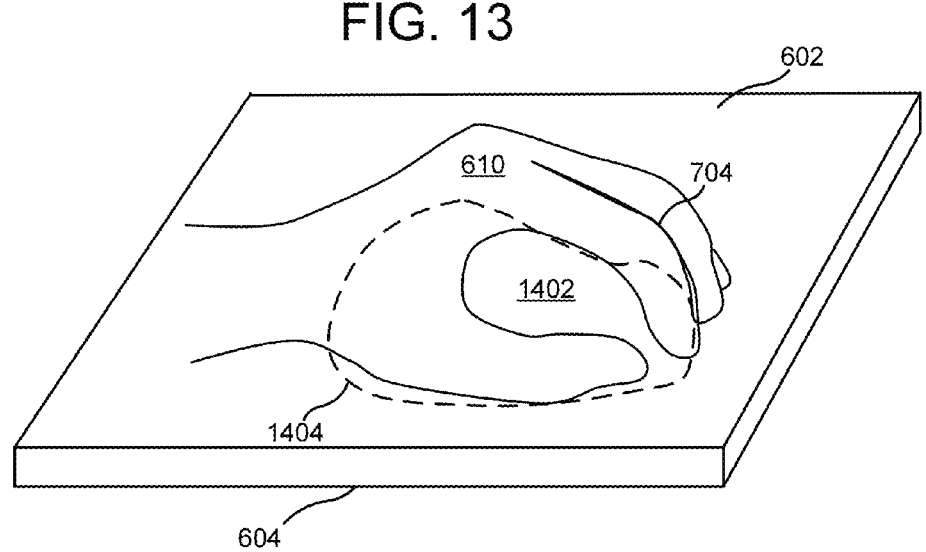
FIG. 14 is a perspective view of an embodiment of a virtual flexible input device with a virtual surface defined at least in part by the relative position of the flat surface and the hand of the user.

FIG. 14 is a perspective view of an embodiment of a virtual flexible input device 106 with a virtual surface 1402 defined at least in part by the relative position of the flat surface 602, the hand 610 of the user, or any other external objects 604. A virtual shape 1404 of the virtual surface 1402 may simply originate in the mind of the user, thus representing a further extrapolation in which the device 106 itself becomes completely virtual, with its virtual surface 1402 being represented by the surface module 202 in a software model of its virtual surface 1404.

Figure 15:
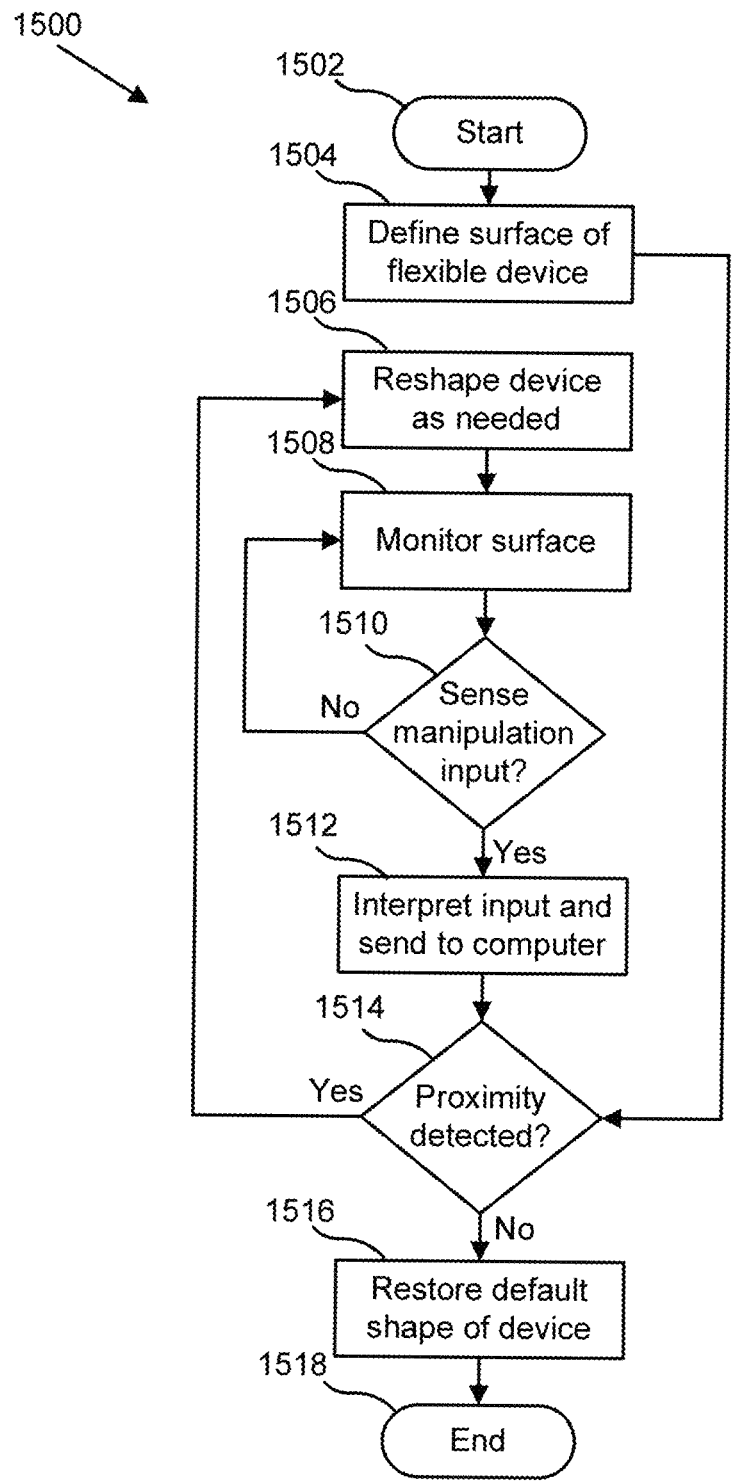
FIG. 15 is a schematic flow chart diagram illustrating one embodiment of a method for flexible tactile computer input in accordance with the subject matter disclosed herein.

FIG. 15 is a schematic flow chart diagram illustrating one embodiment of a method 1500 for flexible tactile computer input in accordance with present embodiments. The method 1500 starts 1502 and the surface module 202 defines 1504 the surface 502/1302/1304. If proximity of one or more external objects 604 including bodily appendages 610/704/1104 is detected 1514 then the device 106 is reshaped 1506 as needed. The sensing module 204 monitors 1508 the surface 502/1302/1304 for manipulation of the flexible input device 106 by the bodily appendages 610/704/1104. If a manipulation is sensed 1510, then the analysis module 206 interprets 1512 the manipulation as input to the computer 110.

In one or more embodiments, the manipulation may comprise pressure, a touch gesture, two-dimensional displacement, three-dimensional motion, pointing, or the like. In an embodiment, sensing 1510 may be performed at a distance, away from the flexible input device 106. In one embodiment, a type of the flexible input device 106 may be explicitly selected by the user, instead of or in addition to implicit inference by the surface module 202. In another embodiment, interpretation of the manipulation may explicitly defined by the user, instead of or in addition to implicit inference by the analysis module 206. Explicit user input of this nature may be used to train the surface module 202 and/or analysis module 206.

Once the proximity of one or more external objects 604/610/704/1104 is no longer detected 1514, then the default shape 504/1304/1404 of the flexible input device 106 is restored 1516 by the surface module 202 and the method 1500 ends 1518.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A machine-implemented method comprising:
    defining a surface of a flexible input device, the surface having a default shape;
    reshaping the surface into a form analogous to a regular non-malleable input device in response to physical proximity to one or more external objects, the objects comprising one or more bodily appendages of a user;
    sensing manipulation of the flexible input device in real time by the one or more bodily appendages in proximity to the surface;
    interpreting the manipulation of the flexible input device as input to a computer via a control area on the surface that is defined more by the manipulation itself than by any distinct physical feature of the control area, wherein the control area is analogous to a fixed control area of the regular non-malleable input device, so as to behave at least in part as the regular non-malleable input device; and
    restoring the default shape when the surface is not in physical proximity to the one or more objects.

2. The method of claim 1, wherein the manipulation comprises pressure, a touch gesture, two-dimensional displacement, three-dimensional motion, or pointing.

3. The method of claim 1, wherein sensing is performed at a distance, away from the flexible input device.

4. The method of claim 1, wherein the regular non-malleable flexible input device is explicitly selected by the user.

5. The method of claim 1, wherein interpretation of the manipulation is explicitly defined by the user.

6. An apparatus comprising:
    a flexible input device having a surface;
    a surface module that
        reshapes the surface into a form analogous to a regular non-malleable input device in response to physical proximity to one or more external objects, the objects comprising one or more bodily appendages of a user, and
        restores a default shape when the surface is not in physical proximity to the one or more objects;
    a sensing module that senses manipulation of the flexible input device in real time by the one or more bodily appendages in proximity to the surface; and
    an analysis module that interprets the manipulation of the flexible input device as input to a computer via a control area on the surface that is defined more by the manipulation itself than by any distinct physical feature of the control area, wherein the control area is analogous to a fixed control area of the regular non-malleable input device, so as to behave at least in part as the regular non-malleable input device.

7. The apparatus of claim 6, wherein the flexible input device is orientation-agnostic.

8. The apparatus of claim 6, wherein the sensing is not confined to any specific region of the surface.

9. The apparatus of claim 6, wherein the direct proximity of the surface to one of the external objects dictates the regular non-malleable flexible input device.

10. The apparatus of claim 9, wherein the surface module senses that one of the one or more external objects is substantially flat, dictating the regular non-malleable flexible input device to be a mouse.

11. The apparatus of claim 6, wherein the surface is pressure-sensitive.

12. The apparatus of claim 6, further comprising one or more pressure sensors coupled to the surface.

13. The apparatus of claim 6, wherein the flexible input device incorporates an internal accelerometer.

14. The apparatus of claim 6, wherein the flexible input device behaves at least in part as a mouse, a trackball, a thumbwheel, a touchpad, a touchscreen, a joystick, a remote, a game controller, a wand, or a pedal.

15. A system comprising:
a computer;
a flexible input device operatively coupled to the computer, the flexible input device having a surface;
a surface module that
  reshapes the surface into a form analogous to a regular non-malleable input device in response to physical proximity to one or more external objects, the objects comprising one or more bodily appendages of a user, and
  restores a default shape when the surface is not in physical proximity to the one or more objects;
a sensing module that senses manipulation of the flexible input device in real time by the one or more bodily appendages in proximity to the surface; and
an analysis module that interprets the manipulation of the flexible input device as input to the computer via a control area on the surface that is defined more by the manipulation itself than by any distinct physical feature of the control area, wherein the control area is analogous to a fixed control area of the regular non-malleable input device, so as to behave at least in part as the regular non-malleable input device.

16. The system of claim 15, further comprising an auxiliary sensor, apart from the flexible input device, the auxiliary sensor being employed by the sensing module.

17. The system of claim 16, wherein the auxiliary sensor is at least in part electromagnetic.

18. The system of claim 15, wherein the flexible input device behaves at least in part as a mouse, a trackball, a thumbwheel, a touchpad, a touchscreen, a joystick, a remote, a game controller, a wand, or a pedal.

19. The system of claim 15, wherein the flexible input device comprises stretchable fabric, silicon electronic skin, rubber, or low-resilience polyurethane foam.

20. The system of claim 15, wherein the system is physically integrated with the flexible input device in a single compact form factor.

21. A computer program product comprising a computer readable non-transitory storage medium storing a computer readable program code executed to perform operations for flexible tactile computer input, the operations of the computer program product comprising:
defining a surface of a flexible input device, the surface having a default shape;
reshaping the surface into a form analogous to a regular non-malleable input device in response to physical proximity to one or more external objects, the objects comprising one or more bodily appendages of a user;
sensing manipulation of the flexible input device in real time by the one or more bodily appendages in proximity to the surface;
interpreting the manipulation of the flexible input device as input to a computer via a control area on the surface that is defined more by the manipulation itself than by any distinct physical feature of the control area, wherein the control area is analogous to a fixed control area of the regular non-malleable input device, so as to behave at least in part as the regular non-malleable input device; and
restoring the default shape when the surface is not in physical proximity to the one or more objects.

22. The computer program product of claim 21, wherein the flexible input device is virtual, and its surface is defined at least in part by the relative position of the external objects.

* * * * *